US012659763B2

(12) United States Patent
Navratil et al.

(10) Patent No.: US 12,659,763 B2
(45) Date of Patent: Jun. 16, 2026

(54) METHODS AND APPARATUSES FOR RADIO COMMUNICATION

(71) Applicant: Nokia Technologies Oy, Espoo (FI)

(72) Inventors: David Navratil, Helsinki (FI); Prajwal Keshavamurthy, Munich (DE)

(73) Assignee: Nokia Technologies Oy, Espoo (FI)

( * ) Notice: Subject to any disclaimer, the term of this patent is extended or adjusted under 35 U.S.C. 154(b) by 582 days.

(21) Appl. No.: 18/007,303

(22) PCT Filed: Aug. 6, 2020

(86) PCT No.: PCT/EP2020/072099
§ 371 (c)(1),
(2) Date: Jan. 30, 2023

(87) PCT Pub. No.: WO2022/028698
PCT Pub. Date: Feb. 10, 2022

(65) Prior Publication Data
US 2023/0284044 A1     Sep. 7, 2023

(51) Int. Cl.
H04W 48/10          (2009.01)
H04W 24/02          (2009.01)
H04W 24/08          (2009.01)

(52) U.S. Cl.
CPC ........... H04W 24/02 (2013.01); H04W 24/08 (2013.01)

(58) Field of Classification Search
CPC ....... H04W 72/30; H04W 4/06; H04W 48/20; H04W 36/0007; H04W 48/12; H04W 60/00; H04W 8/205; H04W 88/08; H04W 48/16; H04W 48/10; H04W 4/08; H04W 76/40; H04W 68/00; H04W 36/0055;

H04W 88/12; H04W 36/023; H04W 76/27; H04W 36/08; H04W 48/08; H04W 68/02; H04W 60/04; H04W 68/04; H04W 74/0866; H04W 76/20; H04W 4/30; H04W 48/00; H04W 68/005; H04W 72/54

See application file for complete search history.

(56) References Cited

U.S. PATENT DOCUMENTS

2012/0263043 A1    10/2012  Xu
2012/0314642 A1*   12/2012  Xu ........................ H04W 48/16
                                                            370/312
(Continued)

FOREIGN PATENT DOCUMENTS

CN          1774124  A      5/2006
CN        101039454  A      9/2007
(Continued)

OTHER PUBLICATIONS

Office Action received for corresponding Japanese Patent Application No. 2023-507942, dated Mar. 25, 2024, 4 pages of Office Action and 10 pages of translation available.
(Continued)

*Primary Examiner* — Quan M Hua
(74) *Attorney, Agent, or Firm* — Lippes Mathias LLP

(57)          ABSTRACT

There is provided a method comprising monitoring (100; 300; 400) at least one multicast control channel (MCCH1) based on at least one selection information (sel) characterizing a selection of at least one multicast control channel configuration (conf1) associated with the at least one multicast control SNET channel (MCCH1).

12 Claims, 5 Drawing Sheets

(56) References Cited

U.S. PATENT DOCUMENTS

| | | | |
|---|---|---|---|
| 2013/0142053 A1 | 6/2013 | Amerga et al. | |
| 2016/0249183 A1* | 8/2016 | Kim | H04W 4/06 |
| 2017/0265166 A1 | 9/2017 | Hosseini et al. | |
| 2018/0049160 A1 | 2/2018 | Hong et al. | |
| 2018/0176744 A1 | 6/2018 | Li et al. | |
| 2018/0206080 A1 | 7/2018 | Chen et al. | |
| 2018/0376384 A1* | 12/2018 | Youn | H04W 36/144 |
| 2021/0376967 A1* | 12/2021 | Ahn | H04W 72/21 |

FOREIGN PATENT DOCUMENTS

| | | | |
|---|---|---|---|
| CN | 101925000 A | 12/2010 | |
| CN | 101998275 A | 3/2011 | |
| CN | 102123134 A | 7/2011 | |
| CN | 102158808 A | 8/2011 | |
| CN | 102301811 A | 12/2011 | |
| CN | 105264922 A | 1/2016 | |
| CN | 107333246 A | 11/2017 | |
| CN | 111225345 A | 6/2020 | |
| EP | 2306757 A1 | 4/2011 | |
| EP | 2512160 A1 | 10/2012 | |
| EP | 3337198 A | 6/2018 | |
| EP | 3337199 A1 | 6/2018 | |
| JP | 2007-251944 A | 9/2007 | |
| JP | 2008535365 A | 8/2008 | |
| JP | 2015503285 A | 1/2015 | |
| JP | 2015142225 A | 8/2015 | |
| JP | 2018-110389 A | 7/2018 | |
| JP | 2018-530207 A | 10/2018 | |
| WO | 2006/104335 A2 | 10/2006 | |
| WO | 2013/170357 A1 | 11/2013 | |
| WO | WO-2015060608 A1 * | 4/2015 | H04W 4/06 |

OTHER PUBLICATIONS

Office Action received for corresponding Chinese Patent Application No. 202080105849.9, dated Jul. 25, 2024, 12 pages of Office Action and No. page of translation available.

"KI1: Update to Solution #3: Add support for UE leaving MBS", 3GPP TSG-WG SA2 Meeting #139E e-meeting, S2-2004699, Agenda Item: 8.9, Huawei, Jun. 1-12, 2020, pp. 1-4.

Office action received for corresponding European Patent Application No. 20754208.5, dated Aug. 13, 2024, 4 pages.

Office Action received for corresponding Japanese Patent Application No. 2023-507942, dated Nov. 18, 2024, 4 pages of Office Action and 2 pages of translation available.

Office Action received for corresponding Chinese Patent Application No. 202080105849.9, dated Mar. 14, 2025, 10 pages of Office Action and no page of translation available.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"3rd Generation Partnership Project; Technical Specification Group Services and System Aspects; Study on architectural enhancements for 5G multicast-broadcast services (Release 17)", 3GPP TR 23.757, V0.4.0, Jun. 2020, pp. 1-157.

"Further enhanced MTC for LTE", 3GPP TSG RAN meeting #74, RP-162283, Agenda Item: 10.4.15, Ericsson, Dec. 5-6, 2016, pp. 1-23.

International Search Report and Written Opinion received for corresponding Patent Cooperation Treaty Application No. PCT/EP2020/072099, dated Apr. 26, 2021, 17 pages.

Office Action received for corresponding Chinese Patent Application No. 202080105849.9, dated Jun. 27, 2025, 10 pages of Office Action and no page of translation available.

* cited by examiner

UE

SNET

METHODS AND APPARATUSES FOR RADIO COMMUNICATION

RELATED APPLICATION

This application was originally filed as PCT Application No. PCT/EP2020/072099, filed on Aug. 6, 2020, which is incorporated herein by reference in its entirety.

FIELD OF THE INVENTION

Various example embodiments relate to enhancements for the provision of multicast sessions in radio networks.

BACKGROUND

Multicast sessions are provided to transmit multicast data to a plurality of UEs.

SUMMARY

According to a first aspect of the description, a method is provided. The method comprises monitoring at least one multicast control channel based on at least one selection information characterizing a selection of at least one multicast control channel configuration associated with the at least one multicast control channel.

Advantageously, more frequent monitoring of multicast control channel change by the UEs, which are not interested in a low latency service, is avoided. Inefficient resource usage, e.g. power utilization, at those UEs is avoided. Consequently, the configuration flexibly and efficiently supports multicast sessions of multicast services with different latency requirements.

To support services with different latency requirements, multiple multicast control channels are introduced, for example corresponding to different latency requirements. The UEs are able to selectively monitor changes of the multicast control channels for those services with certain latency requirements that the UE is interested in.

The solution enables scenarios in which a system is used to provide multicast and/or broadcast services to a variety of applications such as V2X, MCC, Mobile Broadband concurrently.

According to advantageous example, the method comprises receiving a plurality of multicast control channel configurations and associated matching information; selecting the at least one multicast control channel configuration from the received plurality of control channel configurations if the at least one selection information matches with the received matching information; and wherein the monitoring comprises monitoring the at least one multicast control channel according to the selected at least one multicast control channel configuration.

Advantageously, the multicast control channel configuration is selected via the UE and UE effort to monitor is focused on a part of the plurality of available multicast control channels.

According to advantageous example, the method comprises receiving the at least one selection information.

Advantageously, the UE is provided with the selection information.

According to advantageous example, the at least one selection information is associated with at least one QoS value.

Advantageously, the associated with the at least one QoS value enables the UE to select the multicast control channel on QoS level.

According to advantageous example, the matching information characterizes the at least one QoS value or at least one further QoS value.

Advantageously, the matching information provides that the UE can select the multicast channel configuration via QoS.

According to advantageous example, the at least one selection information and the matching information indicate a set of multicast sessions associated with the at least one multicast control channel.

Advantageously, a group configuration identifier can be used to indicate the set of multicast sessions. Moreover, this kind of matching information enables to reduce the number of multicast control channels, as several services with comparable QoS can be offered to UEs via a single or a reduced number of multicast control channels.

According to a second aspect of the description, a method comprises determining a plurality of multicast control channel configurations of multicast control channels based on at least one service property of at least one multicast session associated with a respective multicast control channel; and transmitting at least one of the plurality of determined multicast control channel configurations.

Advantageously, more frequent monitoring of multicast configuration channel change by the UEs, which are not interested in a low latency service, is avoided. Inefficient resource usage, e.g. power utilization, at those UEs is avoided. Consequently, the configuration flexibly and efficiently supports multicast sessions of multicast services with different latency requirements.

To support services with different latency requirements, multiple multicast control channels are introduced, for example corresponding to different latency requirements. The UEs are able to selectively monitor changes of the multicast control channels for those services with certain latency requirements that the UE is interested in.

The solution enables scenarios in which a system is used to provide multicast and/or broadcast services to a variety of applications such as V2X, MCC, Mobile Broadband concurrently.

According to advantageous example, the transmitting of at least one of the plurality of multicast control channel configurations causes at least one apparatus to monitor the at least one transmitted multicast control channel based on at least one selection information characterizing a selection of the at least one multicast control channel configuration associated with the at least one multicast control channel.

According to advantageous example, the method comprises transmitting a plurality of multicast control channel configurations and associated matching information.

Advantageously, a plurality of configurations is provided to the UEs.

According to advantageous example, the method comprises determining the at least one selection information; and transmitting the at least one selection information.

By providing the selection information, the network causes the UEs to select certain multicast control channel configuration provided afterwards and monitor the at least on multicast control channel associated with the selected multicast control channel configuration.

According to advantageous example, the selection information is determined based on at least one service property of the at least one multicast session associated with a respective multicast control channel.

Advantageously, the service property is associated or represented by a respective QoS value and the selection is made based on QoS.

According to advantageous example, the method comprises determining, as part of a respective multicast control channel configuration, a scheduling frequency for the at least one multicast control channel based on at least one service property of the at least one multicast session associated with a respective multicast control channel.

Advantageously, different scheduling frequencies allow an adaption of the UEs to the respective multicast services they want to receive.

According to advantageous example, the at least one selection information is associated with at least one QoS value.

According to advantageous example, the matching information characterizes the at least one QoS value or at least one further QoS value.

According to advantageous example, the at least one selection information and the matching information indicate a set of multicast sessions associated with the at least one multicast control channel.

According to a third aspect of the description, a method comprises: transmitting a join message indicative of at least one multicast session and/or one multicast group; receiving at least one multicast control channel configuration as a response to the transmitted join message; and monitoring at least one multicast control channel based on the received at least one multicast control channel configuration.

Advantageously, more frequent monitoring of multicast control channel change by the UEs, which are not interested in a low latency service, is avoided. Inefficient resource usage, e.g. power utilization, at those UEs is avoided. Consequently, the configuration flexibly and efficiently supports multicast sessions of multicast services with different latency requirements.

To support services with different latency requirements, multiple multicast control channels are introduced, for example corresponding to different latency requirements. The UEs are able to selectively monitor changes of the multicast control channels for those services with certain latency requirements that the UE is interested in.

The solution enables scenarios in which a system is used to provide multicast and/or broadcast services to a variety of applications such as V2X, MCC, Mobile Broadband concurrently.

According to a fourth aspect of this description, a method comprises: receiving at least one join message indicative of at least one multicast session and/or at least one multicast group; determining at least one multicast control channel configuration based on the at least one multicast session and/or based on the at least one multicast group; transmitting the at least one multicast control channel configuration of a plurality of multicast control channel configurations as a response to the received join message.

Advantageously, more frequent monitoring of multicast control channel change by the UEs, which are not interested in a low latency service, is avoided. Inefficient resource usage, e.g. power utilization, at those UEs is avoided. Consequently, the configuration flexibly and efficiently supports multicast sessions of multicast services with different latency requirements.

To support services with different latency requirements, multiple multicast control channels are introduced, for example corresponding to different latency requirements. The UEs are able to selectively monitor changes of the multicast control channels for those services with certain latency requirements that the UE is interested in.

The solution enables scenarios in which a system is used to provide multicast and/or broadcast services to a variety of applications such as V2X, MCC, Mobile Broadband concurrently.

According to advantageous example, the method comprises determining at least one QoS value associated with the at least one multicast session and/or associated with the at least one multicast group; and determining the at least one multicast control channel configuration based on the at least one QoS value.

Advantageously, the determination of the configurations remains flexible with regard to the offered multicast sessions.

According to advantageous example, the method comprises determining the at least one multicast control channel configuration based on a pre-configured QoS value associated with the at least one multicast session and/or associated with the at least one multicast group.

Via the preconfigured QoS value, the multicast control channel configurations can be based on operator's policies.

According to a fifth aspect of this description, an apparatus is provided that comprises: monitoring means to monitor at least one multicast control channel based on at least one selection information characterizing a selection of at least one multicast control channel configuration associated with the at least one multicast control channel.

According to a sixth aspect of this description, an apparatus is provided that comprises: determining means to determine a plurality of multicast control channel configurations of multicast control channels based on at least one service property of at least one multicast session associated with a respective multicast control channel; and transmitting means to transmit at least one of the plurality of determined multicast control channel configurations.

According to a seventh aspect of this description, an apparatus is provided that comprises: transmitting means to transmit a join message indicative of at least one multicast session and/or one multicast group; receiving means to receive at least one multicast control channel configuration as a response to the transmitted join message; and monitoring means to monitor at least one multicast control channel based on the received at least one multicast control channel configuration.

According to an eighth aspect of this description, an apparatus is provided that comprises: receiving means to receive at least one join message indicative of at least one multicast session and/or at least one multicast group; determining means to determine at least one multicast control channel configuration based on the at least one multicast session and/or based on the at least one multicast group; transmitting means to transmit the at least one multicast control channel configuration of a plurality of multicast control channel configurations as a response to the received join message.

According to a ninth aspect of this description, an apparatus is provided that comprises: at least one processor, at least one memory including computer program code, and at least one communication module, the at least one memory and computer program code configured, with the at least one processor, and the at least one communication module, to cause the apparatus at least to: monitor at least one multicast control channel based on at least one selection information characterizing a selection of at least one multicast control channel configuration associated with the at least one multicast control channel.

According to a tenth aspect of this description, an apparatus is provided that comprises: at least one processor, at least one memory including computer program code, and at least one communication module, the at least one memory and computer program code configured, with the at least one processor, and the at least one communication module, to cause the apparatus at least to: determine a plurality of multicast control channel configurations of multicast control channels based on at least one service property of at least one multicast session associated with a respective multicast control channel; and transmit at least one of the plurality of determined multicast control channel configurations.

According to a eleventh aspect of this description, an apparatus is provided that comprises: at least one processor, at least one memory including computer program code, and at least one communication module, the at least one memory and computer program code configured, with the at least one processor, and the at least one communication module, to cause the apparatus at least to: transmit a join message indicative of at least one multicast session and/or one multicast group; receive at least one multicast control channel configuration as a response to the transmitted join message; and monitor at least one multicast control channel based on the received at least one multicast control channel configuration.

According to a twelfth aspect of this description, an apparatus is provided that comprises: at least one processor, at least one memory including computer program code, and at least one communication module, the at least one memory and computer program code configured, with the at least one processor, and the at least one communication module, to cause the apparatus at least to: receive at least one join message indicative of at least one multicast session and/or at least one multicast group; determine at least one multicast control channel configuration based on the at least one multicast session and/or based on the at least one multicast group; transmit the at least one multicast control channel configuration of a plurality of multicast control channel configurations as a response to the received join message.

DESCRIPTION OF THE EMBODIMENTS

Figure 1:
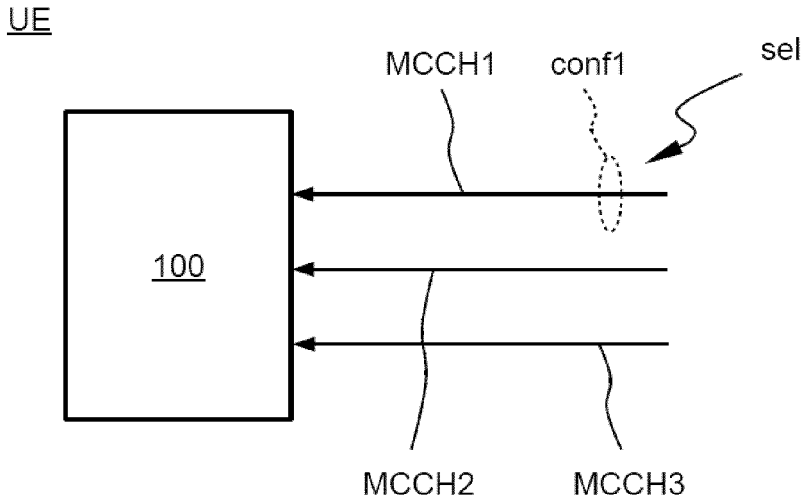
FIGS. 1 and 2 each depicts a schematic block diagram.
Figure 2:
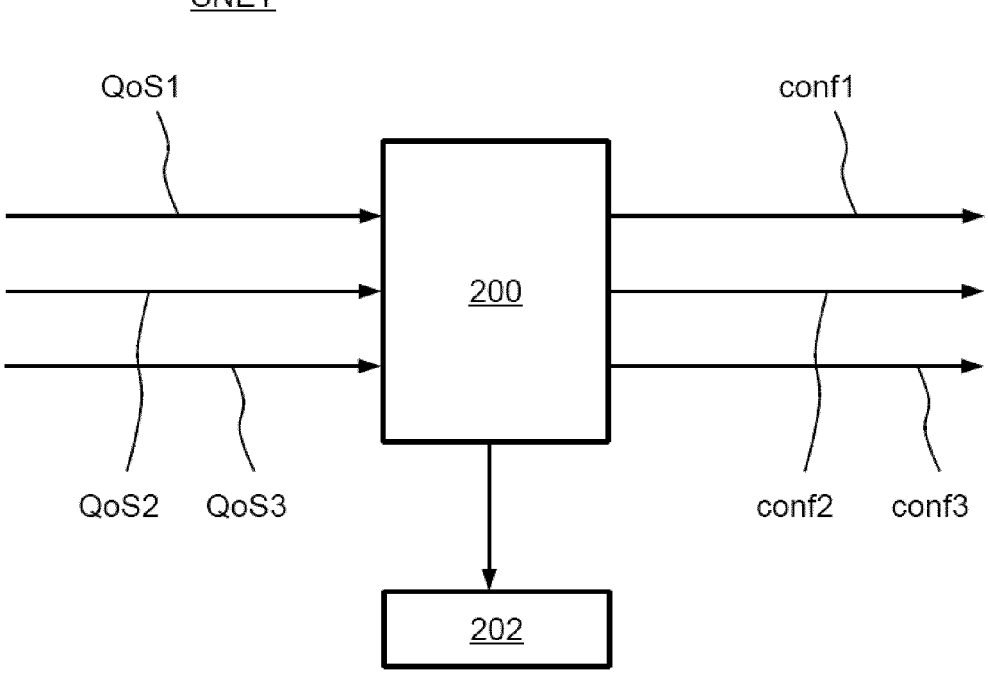

FIGS. 1 and 2 depict schematic block diagrams of an apparatus UE and an apparatus SNET.

The apparatus UE comprises monitoring means or a monitoring module to monitor 100 at least one multicast control channel MCCH1 of a plurality of multicast control channels MCCH1, MCCH2, MCCH3 based on at least one selection information sel characterizing a selection of at least one multicast control channel configuration conf1 from a plurality of control channel configurations conf1, conf2, conf3, the at least one multicast control channel configuration being associated with the at least one multicast control channel MCCH1.

When multiple multicast transport channels are transmitted by the network, the apparatus UE needs to know which of the corresponding multicast control channels it needs to acquire and monitor for a change. The apparatus RAN provides multiple multicast control channels where at least one multicast control channel MCCH1, MCCH2 is configured with a different modification period to match service requirements, e.g. PDB of QoS. Apparatus UE selects which at least one of the plurality of multicast control channels MCCH1, MCCH2 it acquires and monitors for a change notification by determining the interested MCCH1, MCCH2 based on PDB range or specific identifier provisioned to the UE, e.g. along with a session description such as USD.

According to an example, for UEs that are in RRC_CONNECTED mode, the multicast control channel configuration corresponds to a multicast service that UE wants to join. According to an example, the UE is needed to be in RRC_CONNECTED mode in order to send a join message. The multicast control channel configuration is provided over dedicated RRC signaling upon which the UE shall store the received configuration, and apply it also when it enters RRC_IDLE/INACTIVE and monitor the respective multicast control channel MCCH1, MCCH2.

The proposed scheme supports multicast services with different latency requirements by introducing multiple SC-MCCHs with different modification period to match the service requirements. With this, low latency services are supported with shorter modification period for the corresponding SC-MCCHs while supporting non-latency critical services with properly chosen longer modification periods that do not require frequent monitoring of respective SC-MCCHs change.

UEs are configured to selectively monitor SC-MCCHs change for those services with certain PDB/latency requirements that it is interested in. Hence, UEs that are interested in services with less constrained latency requirements monitor SC-MCCH change less frequently and thus saving power. Whereas, low latency requirements of multicast services can be met as those interested UEs continue to monitor the corresponding SC-MCCH change more frequently.

An apparatus SNET comprises determining means or a processing module to determine 200 a plurality of multicast control channel configurations conf1, conf2, conf3 of multicast control channels MCCH1, MCCH2, MCCH3 based on at least one service property QoS1, QoS2, QoS3 of at least one multicast session associated with a respective multicast control channel MCCH1, MCCH2, MCCH3. The apparatus SNET comprises transmitting means or a transmission module 202 to transmit at least one of the plurality of determined multicast control channel configurations conf1, conf2, conf3.

A service property QoS1, 1 QoS2, QoS3 comprises, represents and/or is a QoS value. A QoS value may take, for example, 5G QoS Identifier, QoS class identifier, any comparable identifier or an attribute describing Quality of Service such as, for example, latency or packet delay budget.

In the context of multicast, a multicast service is a product offered to users or user equipments such as group calls. A multicast session represents a period of time during which parties or user equipments consume a multicast service, i.e. a period of time when a group call is established.

Figure 3:
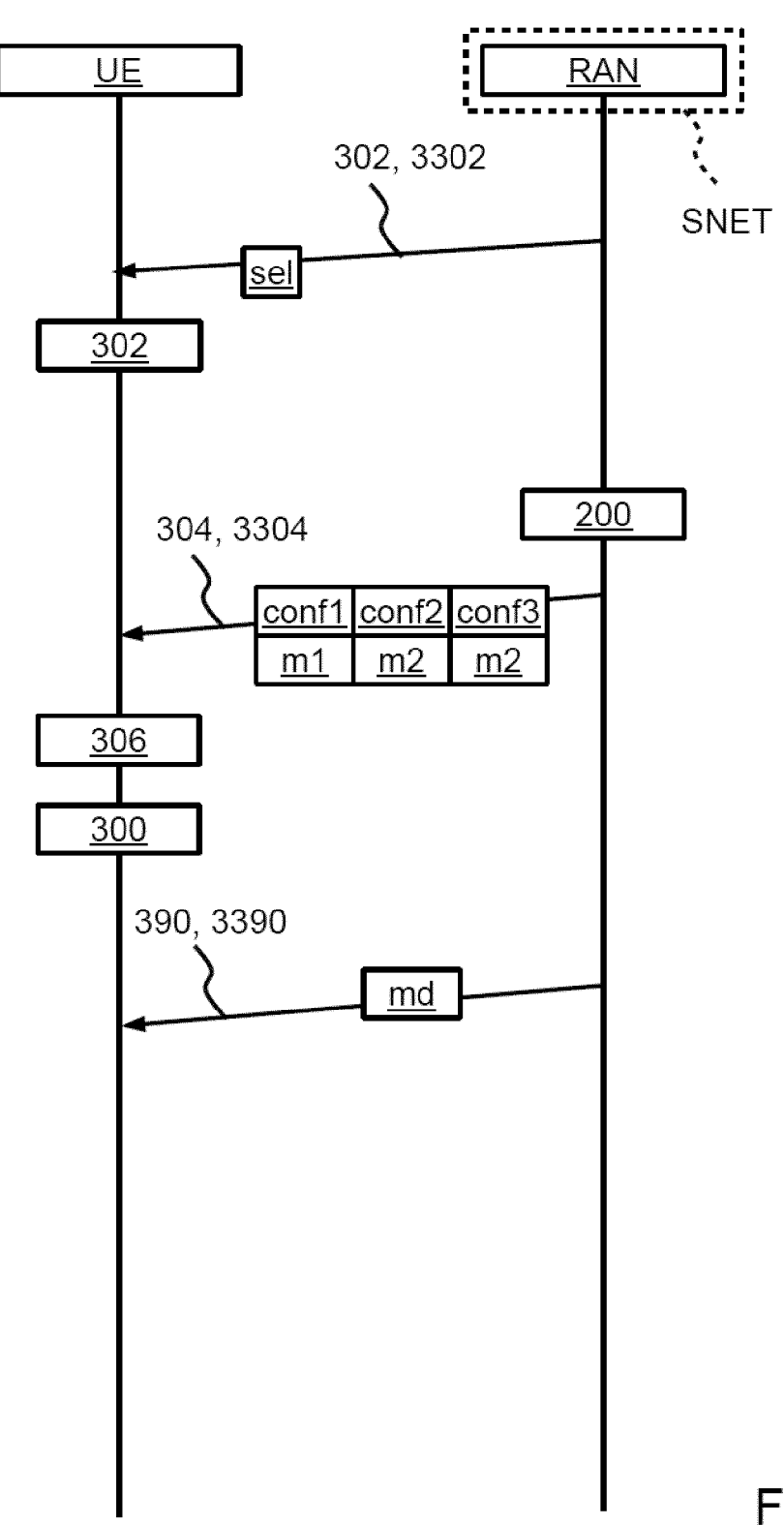
FIGS. 3 to 5 each depicts a schematic sequence diagram.

FIG. 3 depicts a schematic sequence diagram. The apparatus SNET represents an apparatus RAN providing radio domain services to the at least one apparatus UE.

The apparatus UE comprises receiving means or a reception module to receive 302 the at least one selection information sel.

The apparatus UE is provisioned with the at least on selection information sel via USD, the selection information sel containing QoS attributes, for example aggregated QoS requirements or per media stream. The QoS attributes comprise a PDB, for example.

The apparatus RAN determines 200 a scheduling frequency of the multicast control channel, i.e. including SC-MCCH modification period, based on associated 5G QoS Identifier 5QI, e.g. PDB range. Then, the apparatus RAN broadcasts the list of multicast control channels and the associated PDB range, for example by introducing a dedicated SIB message.

The apparatus RAN comprises transmitting means or a transmission module to transmit 3304 the plurality of multicast control channel configurations conf1, conf2, conf3 and associated matching information m1, m2, m3. The apparatus UE comprises receiving means or a reception module to receive 304 the plurality of multicast control channel configurations conf1, conf2, conf3 and associated matching information m1, m2, m3.

The reception 304 of at least one of the plurality of multicast control channel configurations conf1, conf2, conf3 causes at least one apparatus UE to monitor 300 the at least one transmitted multicast control channel MCCH1 based on at least one selection information sel characterizing a selection of the at least one multicast control channel configuration conf1 associated with the at least one multicast control channel MCCH1.

According to an example, the dedicated SIB message contains list of multicast control channels or its configurations conf1, conf2, conf3 with the corresponding PDB range. Upon receiving the dedicated SIB message, based on the provisioned QoS attributes and PDB range associated with the multicasts control channel configurations in SIB via transmission 304, apparatus UE determines which multicast control channel to monitor 300. In case, the QoS attributes provisioned via transmission 304 do not match 5GS 5QI e.g. PDB, then the apparatus UE performs an appropriate mapping of QoS attribute to 5GS 5QI. Thereafter, the apparatus UE monitors 300 the selected at least one multicast control channel according to the selected multicast control channel configuration conf1 for any modification indication or respective change of the multicast control channel.

The apparatus UE comprises selecting means or a processing module to select 306 the at least one multicast control channel configuration conf1 from the received plurality of control configurations conf1, conf2, conf3 if the at least one selection information sel matches with the received matching information m1, m2, m3.

The apparatus UE comprises monitoring means or a monitoring module to monitor 300 the at least one multicast control channel of a plurality of multicast control channels based on the at least one selection information sel characterizing a selection of at least one multicast control channel configuration conf1 from the plurality of control channel configurations conf1, conf2, conf3, the at least one multicast control channel configuration being associated with the at least one multicast control channel MCCH1.

According to an example, the provided scheme supports latency bound reception of multicast services with different latency requirements at UEs in RRC_IDLE or RRC_INACTIVE mode. RAN broadcasts multiple SC-MCCHs with different modification period and the associated PDB ranges. The PDB ranges may be broadcast in a SIB together with a multicast control channel configuration conf1, conf2, conf3.

According to an example, PDB ranges may be broadcast in the content of messages of the respective multicast control channel themselves. The apparatus UE initially acquires the multicast control channels and then selects the ones that should be monitored. In addition, the apparatus UE is provisioned with PDB in USD, which enables the apparatus UE to identify and monitor the corresponding multicast control channel.

The at least one selection information sel is associated with at least one QoS value. The matching information m1, m2, m3 characterizes the at least one QoS value or at least one further QoS value, the further QoS value not matching with the at least one selection information sel.

According to an example, the at least one selection information sel and the matching information m1, m2, m3 indicate a set of multicast sessions associated with the at least one multicast control channel MCCH1.

According to an example, the at least one selection information sel and the matching information m1, m2, m3 indicate a set of multicast sessions associated with the at least one multicast control channel MCCH1, wherein the matching information m1, m2, m3 indicate a set of multicast sessions via a respective Configuration group identifier.

The apparatus RAN comprises transmitting means or a transmission module to transmit 3390 multicast data md of a multicast service via a multicast transport channel like SC-MTCH. The multicast transport channel is configured according to a multicast transport channel configuration indicated via the monitored multicast control channel. The apparatus UE comprises receiving means or a reception module to receive 390 the multicast data md of the multicast service via the multicast transport channel.

Figure 4:
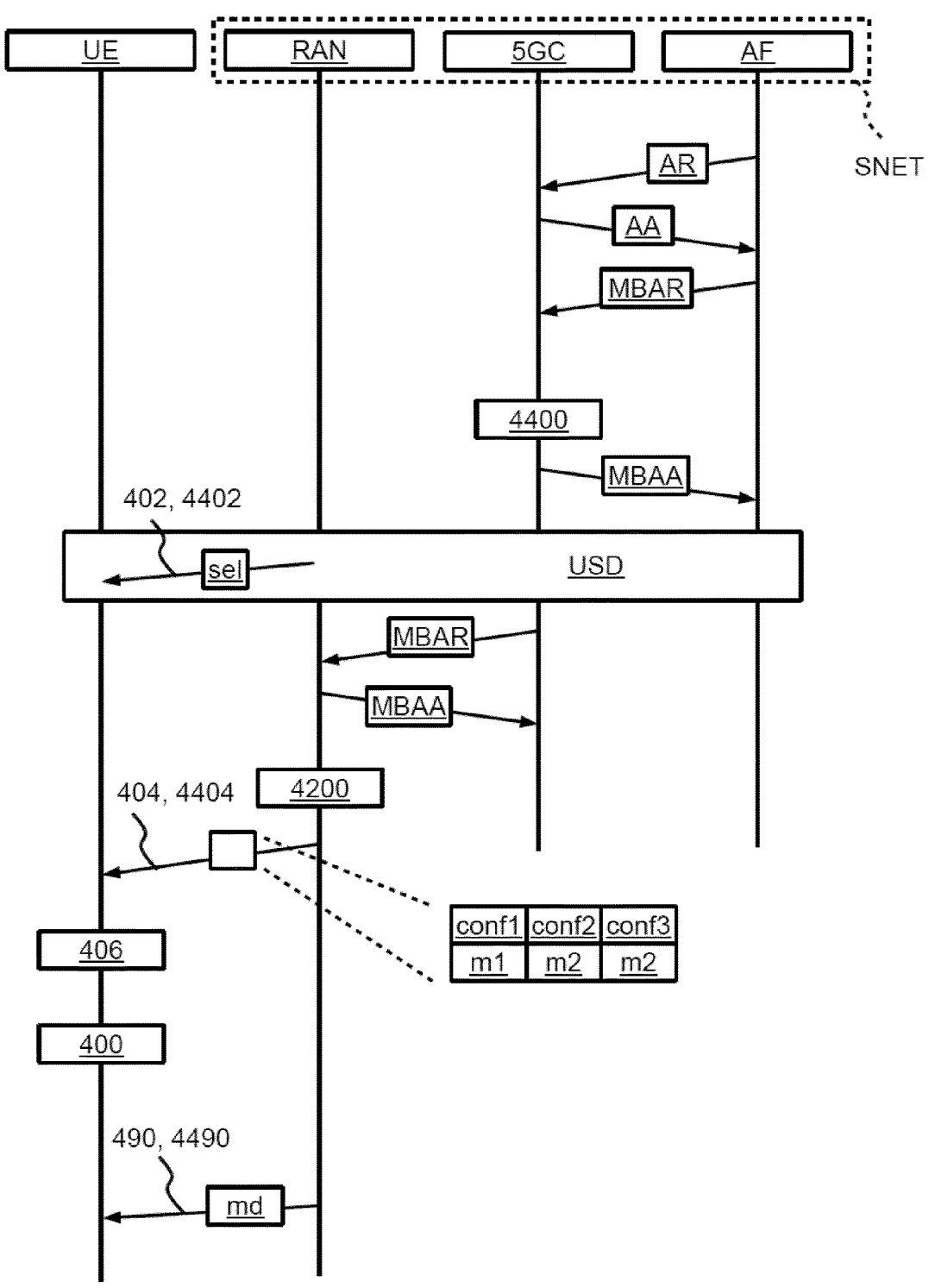

FIG. 4 depicts a schematic sequence diagram. An apparatus AF representing an application function transmits an MBS service allocation request AR, for example a TMGI allocation request, to the apparatus 5GC. Temporary Mobile Group Identity TMGI is used within MBMS to uniquely identify Multicast and Broadcast bearer services. The apparatus 5GC responds with an MBS service allocation answer AA, for example a TMGI allocation request answer. The apparatus AF transmits an MBS service activation request MBAR, for example an MBMS activation request, to the apparatus 5GC.

The apparatus 5GC comprises determining means or a processing module to determine 4400 the at least one selection information sel. The selection information sel is determined based on at least one service property of the at least one multicast session associated with a respective multicast control channel According to an example, the determination 4400 comprises that the apparatus 5GC allocates a Configuration group identifier as the selection information sel. The Configuration group identifier is an identifier for a setting up and identification of at least one service or a plurality of services with associated QoS requirements within a certain range.

The plurality of configuration group identifiers are provided along with the associated QoS value or values via at least one MBMS activation request MBAR to the apparatus RAN, which is answered by the apparatus RAN by an MBMS activation request response MBAA. The request MBAR comprises a list of Configuration group identifiers and an associated QoS values.

According to an example, the apparatus 5GC asks the apparatus RAN to allocate Configuration group identifiers as the apparatus RAN is responsible for determining the scheduling of the multicast control channels. Upon determining the Configuration group identifier, the apparatus 5GC provides this identifier to the apparatus AF as an MBMS activation response MAA and subsequently, the apparatus AF provisions one or more Configuration group identifier in USD to the apparatus UE to cause the apparatus UE to monitor 400 the at least one multicast control channel associated with the Configuration group identifier.

The apparatus RAN comprises transmitting means or a transmission module to transmit 4404 the plurality of multicast control channel configurations conf1, conf2, conf3 and associated matching information m1, m2, m3.

The apparatus UE comprises receiving means or a reception module to receive 402 the at least one selection information sel. The at least one selection information sel is associated with at least one QoS value. The matching information m1, m2, m3 characterizes the at least one QoS value or at least one further QoS value, that will not match with the at least one selection information sel. The at least one selection information sel and the matching information m1, m2, m3 indicates a set of multicast sessions associated with the at least one multicast control channel MCCH1.

The transmitting 404 of at least one of the plurality of multicast control channel configurations conf1, conf2, conf3 causes at least one apparatus UE to monitor 400 the at least one transmitted multicast control channel based on the at least one selection information sel characterizing a selection of the at least one multicast control channel configuration conf1 associated with the at least one multicast control channel.

The selection information is for example an identifier for the at least one group of configurations. The selection information can be also determined by apparatus 5GC or RAN.

The apparatus UE comprises monitoring means or a monitoring module to monitor 400 the at least one multicast control channel of the plurality of multicast control channels based on at least one selection information sel characterizing a selection of at least one multicast control channel configuration conf1 from a plurality of control channel configurations conf1, conf2, conf3, the at least one multicast control channel configuration being associated with the at least one multicast control channel.

The apparatus UE is provided with one or more configuration group identifiers at the selection information sel in USD to indicate the at least one multicast control channel like SC-MCCHs that the apparatus UE is caused to monitor 400, thereby supporting latency bound reception of services in RRC_IDLE or RRC_INACTIVE mode.

The apparatus RAN comprises determining means or a processing module to determine 4200 the plurality of multicast control channel configurations conf1, conf2, conf3 of multicast control channels based on at least one service property of at least one multicast session associated with a respective multicast control channel.

The apparatus RAN comprises determining means or a processing module to determine 4200, as part of a respective multicast control channel configuration con1, conf2, conf3, a scheduling frequency for the at least one multicast control channel based on at least one service property of the at least one multicast session associated with a respective multicast control channel. The determining 4200 comprises that the multicast services with a certain Configuration group identifier, the apparatus RAN determines a corresponding multicast control channel configuration including a scheduling frequency of the multicast control channel and a modification period in dependence on the provided QoS values associated with the Configuration group identifier.

The apparatus RAN determines 4200 at least partly different scheduling frequencies of the plurality of multicast control channels and at least partly different modification periods, for at least a plurality of multicast services associated with Configuration group identifiers and based on QoS requirements. The SIB transmitted 4404 contains a list of multicast control channels or configurations with corresponding Configuration group identifiers and is broadcast. Upon receiving 404 SIB, the apparatus UE searches 406 for multicast control channels matching the associated Configuration group identifier in SIB with the Configuration group identifier provisioned. If a matching Configuration group identifier is found, the apparatus UE monitors 400 the selected multicast control channel.

The apparatus UE comprises receiving means or a reception module to receive 404 a plurality of multicast control channel configurations conf1, conf2, conf3 and associated matching information m1, m2, m3.

The apparatus UE comprises selecting means or a processing module to select 406 the at least one multicast control channel configuration conf1 from the received plurality of control configurations conf1, conf2, conf3 if the at least one selection information sel matches with the received matching information m1, m2, m3.

Therefore, wherein the monitoring 400 comprises monitoring the at least one multicast control channel according to the selected at least one multicast control channel configuration conf1.

The apparatus RAN comprises transmitting means or a transmission module to transmit 4490 multicast data md of a multicast service via a multicast transport channel like SC-MTCH. The multicast transport channel is configured according to a multicast transport channel configuration indicated via the monitored multicast control channel. The apparatus UE comprises receiving means or a reception module to receive 490 the multicast data md of the multicast service via the multicast transport channel.

Figure 5:
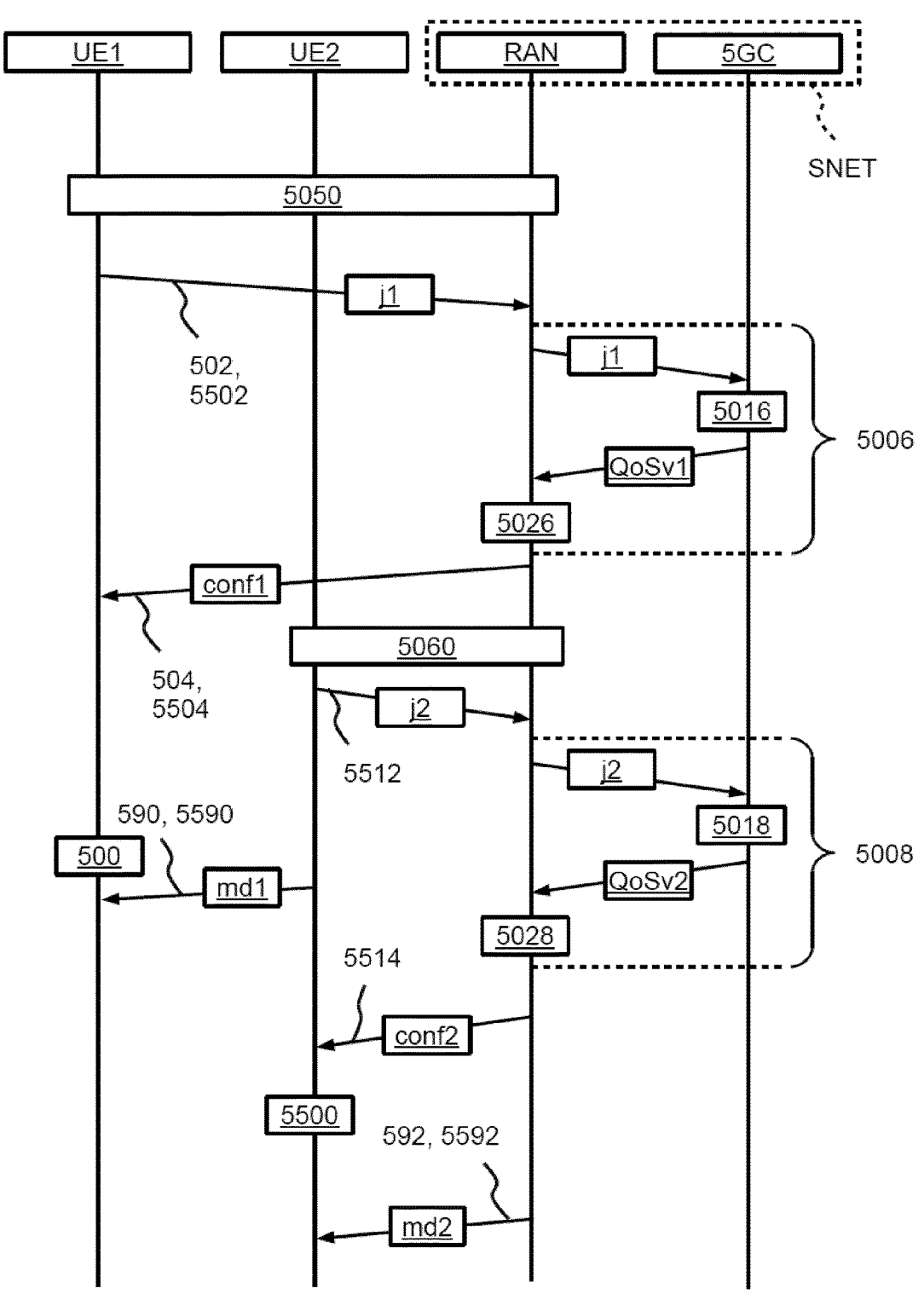

FIG. 5 depicts a schematic sequence diagram. According to block 5050, 5060 an RRC connection is established with the apparatus UE1, UE2, respectively.

An apparatus UE1, UE2 comprises transmitting means or a transmission module to transmit 502 a join message j1, j2 indicative of at least one multicast session and/or one multicast group.

The apparatus RAN comprises receiving means or a reception module to receive 5502, 5512 at least one join message j1, j2 indicative of at least one multicast session and/or at least one multicast group.

The apparatus RAN comprises transmitting means or a transmission module to transmit 5504, 5514 the at least one multicast control channel configuration conf1, conf2 of the plurality of multicast control channel configurations conf1, conf2, conf3 as a response to the received join message j1, j2.

The apparatus 5GC comprises determining means or a processing module to determine 5016, 5018 at least one QoS value QoSv1, QoSv2 associated with the at least one multicast session and/or associated with the at least one multicast group.

The apparatus RAN comprises determining means or a processing module to determine 5026, 5028 the at least one multicast control channel configuration conf1, conf2 based on the at least one QoS value QoSv1, QoSv2.

According to another example, the apparatus RAN comprises determining means or a processing module to determine 5026; 5028 the at least one multicast control channel configuration conf1 based on a pre-configured QoS value associated with the at least one multicast session and/or associated with the at least one multicast group.

Therefore, the apparatus SNET comprises determining means or processing modules to determine 5006, 5008 at least one multicast control channel configuration conf1, conf2 based on the at least one multicast session and/or based on the at least one multicast group, wherein the determining 5006, 5008 may comprise an interaction with another entity.

The apparatus UE1, UE2 comprises receiving means or a reception module to receive 504 at least one multicast control channel configuration conf1 as a response to the transmitted join message j1, j2.

The apparatus UE1, UE2 comprises monitoring means or a monitoring module to monitor 500, 5500 the at least one multicast control channel based on the received at least one multicast control channel configuration conf1, conf2.

When the apparatus UE1, UE2 is needed to join a multicast group e.g. by sending Internet Group Management Protocol IGMP/Multicast Listener discovery Protocol MLD join, or a control plane signaling with 5GC in RRC_CON-NECTED mode, the configuration conf1, conf2 with appropriate modification period for the service that the apparatus UE1, UE2 joins is provided over dedicated RRC signaling. Thereafter, the apparatus UE1, UE2 can store the received configuration conf1, conf2, apply the configuration upon entering RRC_IDLE or RRC_INACTIVE mode, and monitor the respective multicast control channel change.

The apparatus UE1, UE2 is assumed to have established RRC connection with apparatus RAN, respectively. The apparatuses UE1 and UE2 join different multicast sessions with different latency requirements. Consequently, the respective PDU session is modified.

In order to meet the latency requirements, the apparatus RAN chooses the associated configurations conf1 and conf2 for the services and provides two different multicast control channels to the apparatuses UE1 and UE2, for example with different modification periods. Subsequently, the apparatuses UE1 and UE2 can enter RRC_IDLE/RRC_INACTIVE and monitor 500, 5500 the multicast control channel selected via the multicast control channel configuration conf1, conf2.

In examples of FIGS. 3 and 4, the modification of the multicast control channel configuration is signaled via SIB. According to the example of FIG. 5, the network may page the apparatus UE1 and UE2 in the group to trigger RRC connection establishment and provision them with an updated multicast control channel configuration conf1, conf2.

According to an example, a message sent on a multicast control channel contains the multicast control channel configuration of the multicast control channel and use the concept of modification periods as follows. When multicast control channel configuration is modified, the network transmits a change notification during the modification period n. In the following modification period n+1, the multicast control channel message is transmitted with the configuration as in the modification period n but with a multicast control channel message carrying another multicast control channel configuration. The apparatuses UE1 and UE2 apply the received new multicast control channel configuration for acquisition and monitoring of a multicast control channel starting from modification period n+2, which duration is different from the duration of modification periods n and n+1 if the modification period changed.

According to an example, in order to support mobility and service continuity in RRC_IDLE or RRC_INACTIVE, the SC-MCCH provides the multicast channel configuration for a service in neighboring cells. The information about the service availability in neighboring cells and respective SC-MCCH configuration is exchanged between gNBs over an Xn interface.

The apparatus RAN comprises transmitting means or a transmission module to transmit 5590, 5592 multicast data md1, md2 of a respective multicast service via a multicast transport channel like SC-MTCH. The multicast transport channel is configured according to a multicast transport channel configuration indicated via the monitored multicast control channel. The apparatus UE1, UE2 comprises receiving means or a reception module to receive 490, 492 the multicast data md1, md2 of the respective multicast service via the multicast transport channel.

Figure 6:
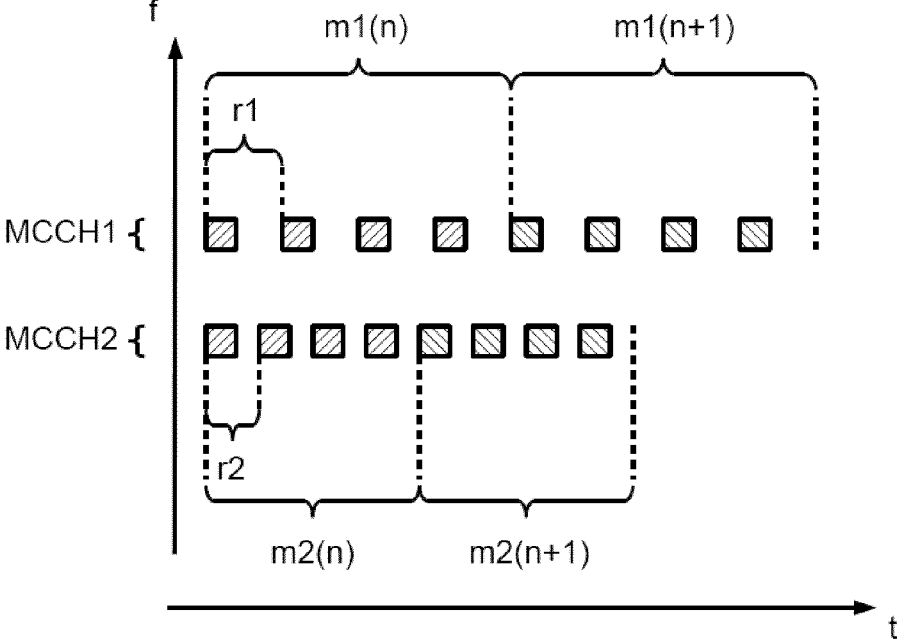
FIG. 6 depicts a schematic time-frequency diagram.

FIG. 6 depicts schematically a time-frequency diagram. The multicast control channels MCCH1 and MCCH2 their different configurations are shown.

The SC-MCCH information, i.e. information transmitted in messages sent over one of the multicast control channels MCCH1 and MCCH2, at least one being for example a SC-MCCH, carries SC-PTM configuration information and is transmitted periodically, using a configurable repetition period r1, r2, which are different in the shown example. The configurable modification periods m1, m2 are used for changing SC-MCCH information which restricts the occurrences of such changes to specific radio frames.

Modification periods m1, m2 comprise a fixed number of radio frames within which the substantially same SC-MCCH information may be transmitted several times, as defined by its scheduling based on the repetition period r1, r2. For modification period m1, m2 consisting of a number x of radio frames, the modification period boundaries are, for example, defined by System Frame Number SFN values for which SFN mod x=0. The content of the multicast control channels MCCH1 and MCCH2 and thus an announcement of a new service or suspension of an active service occurs at the boundaries of the SC-MCCH modification periods m1, m2.

During the first modification period m1n, m2n, change notifications are transmitted, e.g. via the multicast control channel MCCH1, MCCH2 or via a downlink common control channel. During the subsequent second modification m1($n$+1), m2($n$+1), updated information are transmitted via the respective multicast control channel MCCH1, MCCH2.

The modification periods m1, m2 define, for example, periodically appearing boundaries, i.e. radio frames for which SFN mod sc-mcch-ModificationPeriod=zero. According to an example, the contents of different transmissions of MCCH1 or MCCH2 information is different if there is at least one such boundary in-between them.

In order to announce changes of the respective multicast control channel MCCH1, MCCH2 to UEs due to, for example, session start or session suspension, notification mechanism is used. Upon change notification in nth modification period m1, m2, the update of the multicast radio control channel MCCH1, MCCH2 takes place in n+1th modification period m1, m2 as illustrated. The UE acquires the respective MCCH1, MCCH2 since the substantially same subframe in which a change notification is received.

When the network changes some of the MCCH1, MCCH2 information, it notifies the UEs about the change in the first subframe that can be used for MCCH1, MCCH2 transmission in a repetition period r1, r2. LSB bit in 8-bit bitmap when set to '1' indicates the change in MCCH1, MCCH2. Upon receiving a change notification, a UE interested to receive MBMS services transmitted using SC-PTM acquires the new SC-MCCH information starting from the substantially same subframe. The UE applies the previously acquired MCCH1, MCCH2 information until the UE acquires the new MCCH1, MCCH2 information.

There is a plurality of multicast control channels MCCH1, MCCH2 that carry SC-PTM configuration information to provide SC-MTCHs configuration for multicast services. The modification period can be configured for the respective multicast control channel MCCH1 and MCCH2 in order to meet the latency requirements of the multicast services and/or multicast sessions. If there are multicast services with low latency requirements e.g. mission critical services, modification period m1, m2 is configured to be shorter allowing UEs to monitor changes of the MCCH1, MCCH2 more frequently and to acquire the new MCCH1, MCCh2 with low latency.

Figure 7:
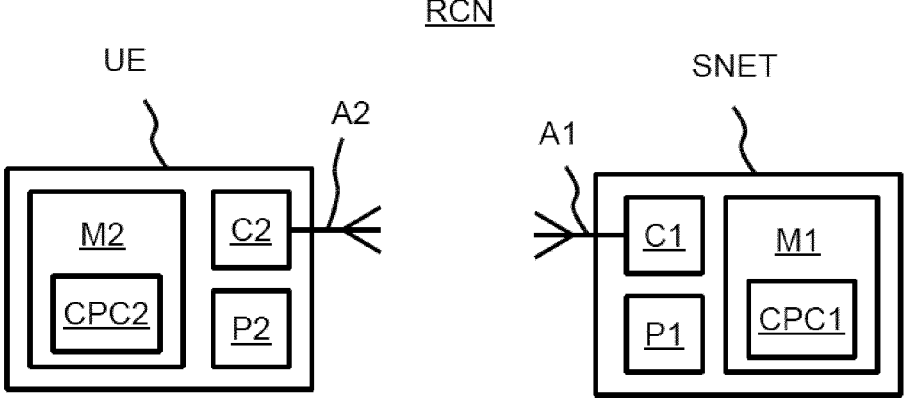
FIG. 7 depicts a schematic radio communications network.

FIG. 7 schematically depicts a radio communications network RCN. The apparatus SNET, UE comprises at least one processor P1, P2, at least one non-volatile memory M1, M2 including computer program code CPC1, CPC2 and at least one communication module C1, C2 that is coupled with at least one antenna A1, A2. The at least one memory M1, M2 and computer program code CPC1, CPC2 are configured, with the at least one processor P1, P2, and the at least one communication module or communication means C1, C2 to cause the apparatus SNET, UE at least to operate according to the present description. The apparatuses SNET and UE communicate via dedicated radio channels. The apparatus SNET may comprise the apparatus RAN as that of FIG. 3 or may comprise the further apparatuses RAN, 5GC and AF as that of FIG. 4 or may comprise the apparatuses RAN and 5GC at that of FIG. 5.

Certain abbreviations that may be found in the description and/or in the figures are herewith defined as follows:

5GC 5G Core
5GS 5G System
3GPP 3rd Generation Partnership Project
5QI 5G QoS Identifier
AF Application Function
gNB Next Generation eNodeB
IGMP Internet Group Management Protocol
LTE Long-Term Evolution
MBB Mobile Broadband
MBMS Multimedia Broadcast/Multicast Service
MCC Mission Critical Communication
MIB Master Information Block
MLD Multicast Listener discovery Protocol
NR New Radio
PDB Packet Delay Budget
PDU Packet Data Unit
PRACH Physical Random Access Channel
QoS Quality of Service
RAN Radio Access Network
SC-MCCH Single Cell Multicast Control Channel
SC-MRB Single Cell MBMS Point to Multipoint Radio Bearer
SC-MTCH Single Cell Multicast Transport Channel
SC-PTM Single Cell Point To Multipoint
SFN System Frame Number
SI System Information
SIB System Information Block
UE User Equipment
TGMI Temporary Mobile Group Identity
USD User Service Description
V2X Vehicle-to-Everything Even though the disclosure has been described above with reference to an example according to the accompanying drawings, it is clear that the exemplary embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the exemplary embodiments can be implemented in various ways. Further, it is clear to a person skilled in the art that the described embodiments may, but are not required to, be combined with other embodiments in various ways.

The invention claimed is:

1. A method comprising:
monitoring at least one Single Cell multicast control channel (SC-MCCH) based on at least one selection information comprising at least one QoS value and a configuration group identifier, the selection information characterizing a selection of at least one multicast control channel configuration associated with the SC-MCCH, wherein the monitoring the SC-MMCH is further based on matching information for respective SC-MCCHs broadcasted in a System Information Block, the matching information includes Packet Delay Budget (PDB) ranges for the respective SC-MCCHs, and a plurality of application QoS attributes mapped to a 5G QoS Identifier (5QI), wherein the mapping to the 5QI is prior to the selection.

2. The method according to claim 1 comprising:
receiving, from broadcast System Information, a plurality of SC-MCCH configurations and associated matching information that characterizes, for each SC-MCCH, at least one QoS value or a QoS value range and a configuration group identifier;
selecting the SC-MCCH configuration if the selection information comprising the at least one QoS value and the configuration group identifier matches the received matching information; and
monitoring according to the selected SC-MCCH configuration, wherein the broadcast matching information includes indication of Packet Delay Budget (PDB) ranges for the respective SC-MCCHs.

3. The method according to claim 1 comprising:
receiving, via User Service Description (USD), the at least one selection information comprising at least one QoS value and a configuration group identifier, and mapping application QoS attributes to 5QI prior to selection.

4. A method comprising:
transmitting a join message indicative of at least one multicast session or one multicast group;
receiving, via dedicated RRC signaling and as a response, at least one SC-MCCH configuration determined based on at least one QoS value associated with the at least one multicast session and/or group and a configuration group identifier, including mapping of application QoS attributes to a 5G QoS Identifier (5QI); and
storing and applying the received SC-MCCH configuration to monitor at least one multicast control channel in RRC_CONNECTED and, upon entry, in RRC_IDLE and/or RRC_INACTIVE, wherein updates to the SC-MCCH configuration are indicated via a change notification in a first modification period and the updated configuration is transmitted in a subsequent modification period, and the network pages the UE group to trigger RRC connection establishment to provide an updated SC-MCCH configuration.

5. An apparatus (UE) comprising at least one processor, at least one memory including computer program code, and at least one communication module, the at least one memory and computer program code configured, with the at least one processor, and the at least one communication module, to cause the apparatus (UE) at least to: monitor at least one SC-MCCH based on at least one selection information comprising at least one QoS value and a configuration group identifier, the selection information characterizing a selection of at least one multicast control channel configuration associated with the SC-MCCH, wherein the monitoring the at least one SC-MCCH is further based on matching information for respective SC-MCCHs broadcasted in a System Information Block, the matching information includes PDB ranges, and a plurality of application QoS attributes mapped to a 5G QoS Identifier (5QI), wherein the mapping to the 5QI is prior to the selection.

6. The apparatus (UE) according to claim 5 being further configured to:

receive, from broadcast System Information, a plurality of SC-MCCH configurations and associated matching information that, for each SC-MCCH, comprises at least one QoS value or QoS value range and a configuration group identifier;

select the SC-MCCH configuration if the selection information comprising the at least one QoS value and the configuration group identifier matches; and monitor according to the selected SC-MCCH configuration, wherein the broadcast matching information includes PDB ranges for the respective SC-MCCHs.

7. The apparatus (UE) according to claim 5 further configured to:

receive, via USD, the at least one selection information comprising at least one QoS value and a configuration group identifier, and perform mapping of QoS attributes to a 5G QoS Identifier (5QI) prior to selection.

8. An apparatus (UE) comprising at least one processor, at least one memory including computer program code, and at least one communication module, the at least one memory and computer program code configured, with the at least one processor, and the at least one communication module, to cause the apparatus (UE) at least to:

transmit a join message indicative of at least one multicast session or one multicast group;

receive, via dedicated RRC signaling and in response, at least one SC-MCCH configuration determined based on at least one QoS value associated with the at least one multicast session and/or group and a configuration group identifier, including mapping of application QoS attributes to 5G QoS Identifier (5QI); and store and apply the received SC-MCCH configuration to monitor at least one multicast control channel in RRC-_CONNECTED and, upon entry, in RRC_IDLE and/or RRC_INACTIVE, wherein updates to the SC-MCCH configuration are indicated via a change notification in a first modification period and the updated configuration is transmitted in a subsequent modification period, and the network pages the UE group to trigger RRC connection establishment to provide an updated SC-MCCH configuration.

9. The apparatus according to claim 8 wherein the at least one SC-MCCH configuration comprises a scheduling frequency, a modification period, a Packet Delay Budget range, and a configuration group identifier.

10. The apparatus of claim 8, wherein the dedicated RRC signaling comprises delivery of an SC-MCCH configuration determined based on a mapped 5G QoS Identifier (5QI), a configuration group identifier, a scheduling frequency, and a modification period.

11. The apparatus of claim 8, wherein the updates to the SC-MCCH configuration comprise a change notification in a first modification period, transmission of updated configuration in a subsequent modification period, application of the updated configuration starting from a second subsequent modification period, and paging of a UE group to trigger RRC connection establishment.

12. The apparatus of claim 8, wherein the change notification comprises transmission during a first modification period, setting of a least significant bit in a bitmap to indicate the change, UE acquisition of new SC-MCCH information starting from a subframe carrying the change notification, and continued application of previously acquired information until the new information is acquired.

* * * * *